(12) United States Patent
Rivest et al.

(10) Patent No.: US 8,538,868 B2
(45) Date of Patent: *Sep. 17, 2013

(54) METHOD AND SYSTEM FOR PREPARING A TRANSFER DOCUMENT

(75) Inventors: Serge Rivest, Mississauga (CA); Michael King, Aurora (CA); Richard Clark, Markham (CA)

(73) Assignee: D+H Limited Partnership, Toronto (CA)

(*) Notice: Subject to any disclaimer, the term of this patent is extended or adjusted under 35 U.S.C. 154(b) by 0 days.

This patent is subject to a terminal disclaimer.

(21) Appl. No.: 13/295,747

(22) Filed: Nov. 14, 2011

(65) Prior Publication Data

US 2012/0303500 A1  Nov. 29, 2012

Related U.S. Application Data

(63) Continuation of application No. 12/562,965, filed on Sep. 18, 2009, now Pat. No. 8,060,439, which is a continuation of application No. 11/514,206, filed on Sep. 1, 2006, now Pat. No. 7,693,784, application No. 13/295,747, which is a continuation of application No. 11/514,207, filed on Sep. 1, 2006.

(30) Foreign Application Priority Data

Sep. 1, 2005 (CA) ..................................... 2518010

(51) Int. Cl.
*G06Q 40/00* (2012.01)
(52) U.S. Cl.
USPC .............. 705/38; 705/35; 705/36 R; 705/39; 705/40; 283/57; 283/58; 283/59

(58) Field of Classification Search
USPC .......................................................... 705/38
See application file for complete search history.

(56) References Cited

U.S. PATENT DOCUMENTS

| 4,357,605 | A | * | 11/1982 | Clements | ...................... 340/538 |
|---|---|---|---|---|---|
| 5,146,403 | A | | 9/1992 | Goodman | |
| 5,825,003 | A | | 10/1998 | Jennings et al. | |
| 6,128,603 | A | * | 10/2000 | Dent et al. | ...................... 705/40 |
| 6,138,102 | A | * | 10/2000 | Hinckley, Jr. | ............... 705/36 R |
| 6,219,650 | B1 | * | 4/2001 | Friend et al. | ................ 705/36 R |
| 7,124,105 | B2 | * | 10/2006 | Hilton | ......................... 705/36 R |
| 7,206,768 | B1 | | 4/2007 | Degroeve et al. | |
| 2002/0029194 | A1 | | 3/2002 | Lewis et al. | |
| 2002/0038271 | A1 | * | 3/2002 | Friend et al. | .................... 705/36 |
| 2002/0052831 | A1 | * | 5/2002 | Levy | ............................... 705/37 |
| 2002/0082987 | A1 | | 6/2002 | Wilson | |
| 2002/0095363 | A1 | * | 7/2002 | Sloan et al. | .................... 705/36 |
| 2002/0116335 | A1 | | 8/2002 | Star | |

(Continued)

*Primary Examiner* — Kirsten Apple
(74) *Attorney, Agent, or Firm* — McMillan lLP

(57) ABSTRACT

A system and method of preparing a transfer document for a client to transfer services provided by counterparties that require recurring transactions using a first account to use a second account is provided. A cashflow analysis for the first account and a cashflow analysis for the second account are performed to determine for each counterparty and each service the desired date to effect the transfer to avoid undesirable cashflow spikes or interruptions in both accounts. A transfer document for transferring services requiring recurring transactions for each counterparty is electronically generated via at least one computer. Each transfer document identifies at least the service to be transferred, the client, the second account, the desired date for the transfer and proof of authorization from the client. A replica of an account document selected according to the service being transferred and the second account is included on the transfer document.

18 Claims, 2 Drawing Sheets

(56) References Cited

U.S. PATENT DOCUMENTS

| | | | |
|---|---|---|---|
| 2002/0174006 A1* | 11/2002 | Rugge et al. | 705/10 |
| 2003/0014339 A1* | 1/2003 | Bush et al. | 705/35 |
| 2003/0187762 A1* | 10/2003 | Coyle | 705/35 |
| 2003/0225642 A1 | 12/2003 | Baker et al. | |
| 2004/0034595 A1 | 2/2004 | Kugeman et al. | |
| 2004/0205008 A1* | 10/2004 | Haynie et al. | 705/31 |
| 2004/0230523 A1 | 11/2004 | Johnson | |
| 2006/0036526 A1* | 2/2006 | Ramos et al. | 705/35 |
| 2006/0047588 A1* | 3/2006 | Lal et al. | 705/30 |
| 2006/0247987 A1* | 11/2006 | Busch et al. | 705/30 |
| 2007/0061260 A1 | 3/2007 | Degroeve et al. | |
| 2007/0106558 A1 | 5/2007 | Mitchell et al. | |

\* cited by examiner

Please switch the following customer's preauthorized payment to the account noted below.

Name and Address

Mr. John Doe
1234 Anystreet
City, Country
ZIP-Postal Code

YOUR PERSONAL SECURE TRAC  123456789

Biller Switch Information

COMPANY OR ORGANIZATION
Cable Co.

ACCOUNT/POLICY/I.D. NUMBER
123-456-789

STREET ADDRESS
123 Cable Street

TELEPHONE NUMBER
(123) 456-7890

LAST TRANSACTION AMOUNT
$ 123 Cable

FREQUENCY
Monthly

LAST TRANSACTION DATE
1 January 2006

Billing Account Information

001
Date
PAY TO THE ORDER OF _____ $ _____
VOID
_____ /100 DOLLARS
MEMO _____

Sending this form to my financial institution means that I am advising the Company of the following: I authorize the Company and my financial institution to debit/credit my bank account for payment as indicated above. I understand that my financial institution is not responsible for verifying these payments from my account. I will notify the Company promptly in writing if I close or make other changes to my account. I may cancel this authorization at any time in writing to the Company. However, I am still responsible for my contract obligations to the Company.

Customer Signature(s) _____ / _____

Figure 2

METHOD AND SYSTEM FOR PREPARING A TRANSFER DOCUMENT

This application is a continuation of U.S. patent application Ser. No. 12/562,965 filed on Sep. 18, 2009, which is a continuation of U.S. patent application Ser. No. 11/514,206 filed on Sep. 1, 2006 and issued as U.S. Pat. No. 7,693,784, and claims priority from U.S. patent application Ser. No. 11/219,856 filed on Sep. 7, 2005 and issued as U.S. Pat. No. 7,716,124. This application is also a continuation of U.S. patent application Ser. No. 11/514,207 filed on Sep. 1, 2006. The contents of all of these documents are incorporated herein in their entirety by reference.

FIELD OF THE INVENTION

The present invention relates to a system and method for assisting a client in the transfer of usage of accounts (e.g. pre-authorized debits and credits) at one or more financial institutions. More specifically, the present invention relates to a system and method which tracks cashflow and prepares a suitable document to effect the transfer of the various services using a first account to a second account which can be at the same, or another, financial institution.

BACKGROUND OF THE INVENTION

The financial industry has undergone significant changes in the last ten years. In addition to traditional banks, trust companies and other conventional financial institutions, many new financial institutions and categories of financial institutions have been created. These many financial institutions have accordingly become increasingly competitive in acquiring clients and make significant efforts to acquire new clients from other, competitor, institutions. Significant marketing efforts, discounts, service bundles and other incentives are employed by financial institutions to attract new clients, often from their competitors.

At the same time as the financial institutions have become more competitive in acquiring clients, the array of services that financial institutions offer their clients has increased and can include automated payments of utility company and other bills of the client, investment and money management services, automated transfers between accounts and/or institutions, etc. Also, financial institutions have introduced new services for their existing clients in efforts to retain those clients, increase profitability and/or expand the range of services offered by the financial institution. Further, many non-financial service providers have established interfaces to financial institutions which allow them to directly debit or credit their client's accounts with the financial institution.

As a consequence of the wide array of services available to the clients of financial institutions, clients may have a great deal of difficulty and/or inconvenience in transferring their existing services, including pre-authorized payments, credits and even their payroll, from an existing account to a new account, at the same financial institution or at a new institution. Thus, despite the above-mentioned significant efforts expended by a financial institution to attract new clients and/or retain existing clients, the inconvenience caused to, and effort required by, clients to transfer and/or reestablish existing services for a new account can be such a significant disincentive that the clients will not establish the new account with an existing financial institution and/or move to a new financial institution.

It is desired to have a system and method for preparing transfer documents to assist a client to transfer and/or reestablish the financial services using a first account at a financial institution to a second account at a financial institution, whether the same financial institution or a new financial institution.

SUMMARY OF THE INVENTION

It is an object of the present invention to provide a novel system and method for preparing transfer documents to assist clients in transferring financial services, such as pre-authorized debits and credits, using a first account to instead use a second account, which obviates or mitigates at least one disadvantage of the prior art.

According to a first aspect of the present invention, there is provided a method of preparing a transfer document for a client to transfer services provided by counterparties that require recurring transactions using a first account to use a second account, the method comprising the steps of: (i) performing a cashflow analysis for the first account and a cashflow analysis for the second account to determine for each counterparty and each service the desired date to effect the transfer to avoid undesirable cashflow spikes or interruptions in both accounts; (ii) generating a transfer document for transferring services requiring recurring transactions for each counterparty, each transfer document identifying at least the service to be transferred, the client, the second account, the desired date for the transfer and proof of authorization from the client; (iii) including on said transfer document a replica of an account document selected according to the service being transferred and the second account; and (iv) providing said transfer documents to said counterparties.

BRIEF DESCRIPTION OF THE DRAWINGS

Preferred embodiments of the present invention will now be described, by way of example only, with reference to the attached Figures, wherein:

FIG. 2 shows a transfer document prepared during the method illustrated in FIG. 1.

DETAILED DESCRIPTION OF THE INVENTION

Figure 1:
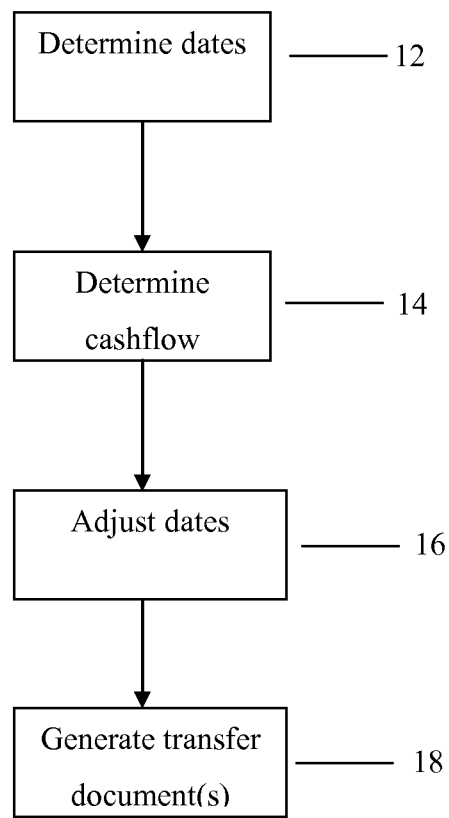
FIG. 1 shows a flowchart illustrating the steps of a method for preparing a transfer document in accordance with the present invention.

The inventive system and method described herein is contemplated for use as part of a larger system for assisting a financial institution client to transfer financial services such as pre-authorized debits and credits using a first account to use a second account. It is contemplated that the system will typically be operated by a third party service organization and financial institutions will retain the services of the third party service organization as necessary, but it is also contemplated that a financial institution itself can operate the system.

In the following discussion, it is assumed that the first account is at a first (old) financial institution and that the second account is at a second (new) financial institution, but the present invention is not so limited and both the first and second account can be at a single financial institution, albeit being at different branches of the financial institution and/or being different types of account (i.e., checking account, investment or money market account, etc.) or even two of the same type of account at a single branch. Further, as used herein, the term "account" is intended to comprise any financial account that can be maintained for a client and includes, without limitation, checking accounts, savings accounts, money market or investment accounts, credit card accounts, line of credit accounts, etc.

As part of the process of transferring services of a client from a first account to a second account, the necessary client information and the authorization of the client must be provided in a suitable document, referred to herein as a transfer document. The party providing the service is referred to herein as a counterparty as is typically a merchant providing a service requiring recurring (e.g. monthly) payments, such as telephone, cable, utilities, club memberships, etc.

FIG. 1 shows the steps of the method after the transfer request has been processed and the necessary information for the transfer has been gathered. Specifically, at step 12 a cashflow engine examines the services of the client which are to be transferred and determines the dates on which the services will effectively be transferred, including any lead time needed to effect a transfer. The lead time is determined from the billing cycle of the financial service provider, as well as the time required for that provider to record and effect a change. The lead time may be provided by the service providers or may be calculated by the cashflow engine based on historical lead times for the particular service, service provider and/or financial institution or combination thereof. This step creates a transfer window covering the date when the transfer process is effectively begun (first service transferred to second account) and the date when it effectively ends (all services transferred to the second account). If only a single service is being transferred, the transfer window can effectively be as short as a single day.

The next step 14 is to determine the cashflows in the first account and the cashflows in the second account which will result as services are transferred. As part of this cashflow analysis, the cashflow engine considers the equivalent dates for each service to be transferred from the first account to the second account. Specifically, as determined in the previous step. From this analysis, the cashflow engine determines at step 16 the desired dates for each transfer to be effected which will avoid possible, undesirable cashflow spikes or interruptions in both the first account and the second account.

Then, at 18, an appropriate transfer document is created by a transfer engine for each service being transferred. The format for the particular transfer document created by the transfer engine for a counterparty can be a generic, letter-type document which has been previously used successfully with the particular counterparty or can be a document which has been agreed to be accepted by the counterparty or can be a custom form provided by the counterparty, or any other suitable document. The content of the transfer document includes information to identify the client (name, address, other required information), the service being transferred and the second account to which the service is being transferred. If necessary, information identifying the first account may also be included.

The authorization provided by the client may be an image of the client's signature from an authorization form, or other proof of authorization by the client, such as a PIN or and audio recording, or any other accepted form of authorization. The necessary authorization is appended to each transfer document by the transfer engine to provide the necessary authorization to each respective counterparty. Preferably, there is a database attached to the transfer engine identifies the authorization requirements for various counterparties.

In addition to the client authorization, the transfer document further includes a replica of an account document which is typically used in the transfer process. Examples of account documents replicated include documents such as voided checks and credit card transaction records. The replica is intended to resemble an account document, but is not a copy of an actual account document. By including the replica of the account document as part of the transfer document, the transfer document is more readily recognized by the counterparty as authentic and is processed more rapidly than would otherwise be the case. In the absence of the replica account document, the transfer request may be processed more slowly or not processed at all.

FIG. 2 shows an exemplary transfer document prepared using the above-described method.

As will be apparent to those of skill in the art, transfer documents can also be electronic documents and/or datasets of pre-agreed format containing the above information which can be transferred electronically to the counterparties.

The construction of the cashflow and transfer engines is not particularly limited and can comprise one or more personal computers connected within a larger system via a local area network and executing an operating system such as Microsoft Windows XP.

Once the transfer engine completes each transfer document with the appropriate and required information to effect the transfer to the second account, including the desired date for the transfer to be effected, the transfer document is forwarded to the counterparty. The transfer document may be printed for subsequent dispatch by mail or courier service to the appropriate counterparty, sent via facsimile, either as a printout or electronically to the appropriate counterparty, sent using electronic data transfer via the Internet or another communications network or via any other appropriate method of providing the transfer order and related information to the counterparty. The database used to record counterparty authorization preferably also includes an indication of the preferred method for providing transfer orders to each counterparty.

A similar transfer document and method can further be used when the scheduled date for the transfer of the balance of account has been reached. The transfer engine creates the necessary document to transfer the balance of account, appending the client information and authorization as discussed above. In a similar manner to the transfer documents prepared at step above, the balance of account transfer document is dispatched to the financial institution offering the first account, via hardcopy, facsimile, etc. as set forth earlier.

While the discussion above refers to circumstances wherein the client is transferring services between accounts at one or more financial institutions, it is contemplated that the present invention can also be employed to re-establish services where the account information of a client needs to be changed to reflect changes in the transit number or other information of the financial institution at which the accounts are located or specific information about the account needs to be changed. For example, information identifying the account and/or financial institution may change as a result of a merger between to financial institutions, an amalgamation of two branches of a financial institution, etc., or for preauthorized credit card transactions, the expiry date of the credit card will need to be updated from time to time. The present invention can effectively deal with any of these circumstances and a variety of others as may occur to those of skill in the art.

The above-described embodiments of the invention are intended to be examples of the present invention and alterations and modifications may be effected thereto, by those of skill in the art, without departing from the scope of the invention which is defined solely by the claims appended hereto.

What is claimed is:

1. A method of preparing a transfer document for a client to transfer services provided by counterparties that require recurring transactions using a first account to use a second account, the method comprising the steps of:
   (i) performing a cashflow analysis for the first account and a cashflow analysis for the second account to determine for each counterparty and each service the desired date to effect the transfer to avoid undesirable cashflow spikes or interruptions in both accounts;
   (ii) electronically generating, via at least one computer, a transfer document for transferring services requiring recurring transactions for each counterparty, each transfer document identifying at least the service to be transferred, the client, the second account, the desired date for the transfer and proof of authorization from the client;
   (iii) including on said transfer document a replica of an account document selected according to the service being transferred and the second account; and
   (iv) providing said transfer documents to said counterparties.

2. The method of claim 1 wherein said replica account document is a replica of a voided check.

3. The method of claim 1 wherein said replica account document is a replica of a credit card transaction record.

4. The method of claim 1 wherein said transfer document is an electronic document and is forwarded via electronic delivery.

5. The method of claim 1, wherein said client authorization is determined according to a database which identifies client authorization requirements for different services.

6. The method of claim 1 wherein the first account is provided by a first financial institution and the second account is provided by a second financial institution.

7. The method of claim 1 wherein the first account is provided by a first branch of a financial institution and the second account is provided by a second branch of the financial institution.

8. The method of claim 1 wherein the first and second accounts are provided by the same financial institution, the first account being a different type of account than the second account.

9. The method of claim 1 wherein the first and second accounts are provided by the same financial institution.

10. The method of claim 1 wherein the proof of authorization from the client in said transfer document is a digital reproduction of the signature of the client.

11. The method of claim 1 wherein the proof of authorization from the client in said transfer document is a confirmation of a personal identification number identifying the client.

12. The method of claim 1 wherein the proof of authorization from the client in said transfer document is an audio recording of the client authorizing the transfer.

13. A system for preparing transfer documents to assist a client to transfer services provided by counterparties that require recurring transactions using a first account to a second account, comprising:
   a counterparty database operable to maintain and provide counterparty information regarding the counterparties providing services to be transferred for a client, the counterparty information identifying the information required by the respective counterparty to effect a transfer and an indication of any mandatory lead time required by the counterparty to effect a transfer;
   a cashflow engine operable to examine each service to be transferred from a first account to a second account and the date the service debits or credits the account of the client, the cashflow engine determining for each service to be transferred a desired date for the transfer to be effected using the counterparty database, the determined date being selected to avoid undesirable cashflow spikes or interruptions in both the first account and the second account; and
   a transfer engine comprising at least one computer for creating a transfer document containing transfer information required by each respective service for transferring said services provided by said counterparties that require recurring transactions, said transfer information including said desired date for the transfer to be affected, client identity information and proof of authorization, said transfer document also containing a replica of an account document associated with the service being transferred and the second account, said transfer engine forwarding said transfer documents to each said respective counterparty.

14. The system of claim 13 wherein the transfer document comprises a paper form.

15. The system of claim 13 wherein the transfer document comprises an electronic dataset.

16. The method of claim 1 wherein said generating comprises printing said transfer document.

17. The method of claim 1 wherein said providing comprises faxing said transfer document.

18. The method of claim 1 wherein said providing comprises sending said transfer document via electronic data transfer.

* * * * *